US012186849B1

United States Patent
Ho Chek Beng

(10) Patent No.: US 12,186,849 B1
(45) Date of Patent: Jan. 7, 2025

(54) METHOD OF REPAIRING AN AIRFOIL HAVING TIP COOLING PASSAGES

(71) Applicant: GE Infrastructure Technology LLC, Greenville, SC (US)

(72) Inventor: George Ho Chek Beng, Singapore (SG)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/501,482

(22) Filed: Nov. 3, 2023

(51) Int. Cl.
  *B23P 6/00* (2006.01)
  *F01D 5/00* (2006.01)

(52) U.S. Cl.
  CPC .............. *B23P 6/007* (2013.01); *F01D 5/005* (2013.01); *B23P 2700/06* (2013.01); *F05D 2230/10* (2013.01); *F05D 2230/80* (2013.01)

(58) Field of Classification Search
  CPC ..... B29C 64/393; B29C 64/268; B29C 64/35; F01D 5/005; B29L 2031/08; F05D 2230/80; F05D 2230/10; B23P 6/007; B23P 2700/06
  See application file for complete search history.

(56) References Cited

U.S. PATENT DOCUMENTS

| | | | |
|---|---|---|---|
| 7,270,514 B2 | 9/2007 | Lee | |
| 7,587,818 B2 | 9/2009 | Gorman et al. | |
| 11,498,132 B2 | 11/2022 | Shi et al. | |
| 2007/0003416 A1 | 1/2007 | Bewlay et al. | |
| 2013/0104397 A1 | 5/2013 | Bunker | |
| 2019/0275618 A1* | 9/2019 | Wassmer | B23K 26/14 |
| 2019/0366480 A1* | 12/2019 | Kotliar | B23K 26/08 |
| 2020/0384692 A1* | 12/2020 | Shi | B29C 64/35 |
| 2022/0090511 A1* | 3/2022 | Brandl | F01D 5/20 |
| 2024/0133298 A1* | 4/2024 | Williamson | F01D 5/20 |

* cited by examiner

*Primary Examiner* — Lee A Holly
(74) *Attorney, Agent, or Firm* — Dority & Manning, P.A.

(57) ABSTRACT

A method of repairing an airfoil of a turbine component is provided. The airfoil includes a tip rail that at least partially defines a plurality of tip cooling passages. The turbine component having undergone at least one operational cycle such that a tip portion of the tip rail is outside of a design specification range. The method includes removing the tip portion of the tip rail such that a workpiece interface is defined at a radially outer end of the airfoil. After removing the tip portion, at least one tip cooling passage of the plurality of tip cooling passages extends to an opening on the workpiece interface. The method further includes additively manufacturing an extension segment onto the workpiece interface. The method further includes machining the extension segment to form a replacement tip portion of the tip rail that is within the design specification range.

18 Claims, 10 Drawing Sheets

METHOD OF REPAIRING AN AIRFOIL HAVING TIP COOLING PASSAGES

FIELD

The present disclosure relates generally to a method of repairing airfoils of a turbine component. More specifically, the present disclosure relates to a method of repairing an airfoil of a turbine component having tip cooling passages.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand around turbine components to produce work. For example, expansion of the combustion gases in the turbine section may rotate a rotor shaft connected, e.g., to a generator to produce electricity. The combustion gases then exit the gas turbine via the exhaust section.

The turbine blades are surrounded by hot combustion gases, and effective cooling is therefore required in order to extend the useful life of the turbine blade. The turbine blade airfoils are hollow and disposed in flow communication with the compressor so that pressurized air may be bled from the compressor and used in cooling the airfoils. Airfoil cooling is quite sophisticated and may be effected using various forms of internal cooling channels and features, as well as cooling holes through the walls of the airfoil for discharging the cooling air.

The blade tip is particularly difficult to cool since it is located directly adjacent to the turbine shroud and the hot combustion gases which flow through the tip gap. Accordingly, a portion of the air channeled inside the blade is typically discharged through the tip for cooling. The tip typically includes a continuous radially outwardly projecting edge rib formed coextensively along the pressure and suction sides between the leading and trailing edges. The edge rib follows the aerodynamic contour around the blade and is a significant contributor to the aerodynamic efficiency of the blade.

The edge other types of rotor tips sometimes need to be repaired after the turbomachine has been in service for some time, due to the effects of erosion or high-temperature oxidation. The repair process usually involves adding material to the tip and subsequently machining the tip back to meet the specifications of the turbine blade. However, known repair methods often result in cracking around the tip cooling passages due to the intensity of the welding heat around this area. Additionally, known repair methods often result in damaging back strikes when the cooling holes are re-opened and the drill or laser impacts the back wall of the cooling passage.

With these considerations in mind, it should be apparent that new processes for repairing the tips of blades for turbomachines would be welcome in the art.

BRIEF DESCRIPTION

Aspects and advantages of the methods in accordance with the present disclosure will be set forth in part in the following description, or may be obvious from the description, or may be learned through practice of the technology.

In accordance with one embodiment, a method of repairing an airfoil of a turbine component is provided. The airfoil includes a tip rail that at least partially defines a plurality of tip cooling passages. The turbine component having undergone at least one operational cycle such that a tip portion of the tip rail is outside of a design specification range. The method includes removing the tip portion of the tip rail such that a workpiece interface is defined at a radially outer end of the airfoil. After removing the tip portion, at least one tip cooling passage of the plurality of tip cooling passages extends to an opening on the workpiece interface. The method further includes additively manufacturing an extension segment onto the workpiece interface. The method further includes machining the extension segment to form a replacement tip portion of the tip rail that is within the design specification range.

In accordance with another embodiment, a method of repairing an airfoil of a turbine component is provided. The airfoil includes a tip rail that at least partially defines a plurality of tip cooling passages. The turbine component having undergone at least one operational cycle such that a tip portion of the tip rail is outside of a design specification range. The method includes removing the tip portion of the tip rail such that a workpiece interface is defined at a radially outer end of the airfoil. After removing the tip portion, at least one tip cooling passage of the plurality of tip cooling passages extends to an opening on the workpiece interface. The method further includes additively manufacturing an extension segment onto the workpiece interface and across the opening. The method further includes machining the extension segment to form a replacement tip portion of the tip rail that is within the design specification range. The method further includes re-opening the at least one tip cooling passage of the plurality of tip cooling passages.

These and other features, aspects and advantages of the present methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods, including the best mode of making and using the present systems and methods, directed to one of ordinary skill in the art, is set forth in the specification, which makes reference to the appended figures, in which.

DETAILED DESCRIPTION

Figure 1:
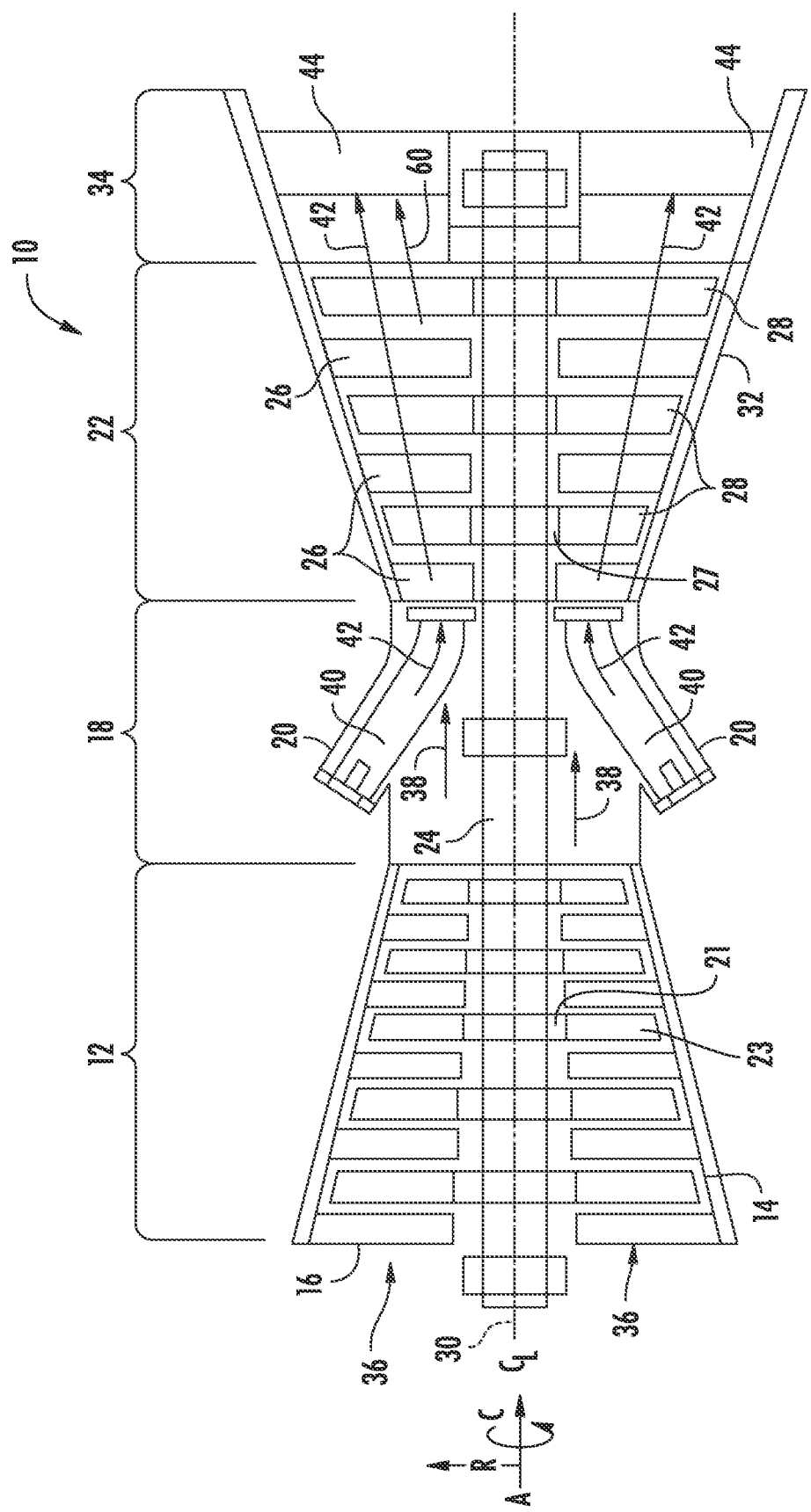
FIG. 1 is a schematic illustration of a turbomachine in accordance with embodiments of the present disclosure.

Reference now will be made in detail to embodiments of the present methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that two or more areas defining a flow passage are joined to one another such that a fluid is capable of making the connection (i.e., flowing) between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. In the context of an exhaust diffuser assembly, "upstream" refers to the direction closest to the turbine section, and "downstream" refers to the outlet end of the exhaust diffuser assembly.

The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like mean that two components are joined in contact with one another and that no intermediate components or features are present.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "and/or" refers to a condition satisfied by any one of the following: A is true (or present) and B is false (or not present), A is false (or not present) and B is true (or present), and both A and B are true (or present).

Here and throughout the specification and claims, where range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine engine 10. Although an industrial or land-based gas turbine engine is shown and described herein, the present disclosure is not limited to an industrial and/or land-based gas turbine engine, unless otherwise specified in the claims. For example, the invention as described herein may be used in any type of turbomachine including but not limited to a steam turbine, an aircraft gas turbine, or a marine gas turbine.

As shown, the gas turbine engine 10 generally includes a compressor section 12. The compressor section 12 includes a compressor 14. The compressor section 12 includes an inlet 16 that is disposed at an upstream end of the gas turbine engine 10. The gas turbine engine 10 further includes a combustion section 18 having one or more combustors 20 disposed downstream from the compressor section 12. The gas turbine engine 10 further includes a turbine section 22 that is downstream from the combustion section 18. A shaft 24 extends generally axially through the gas turbine engine 10.

The compressor section 12 may generally include a plurality of rotor disks 21 and a plurality of rotor blades 23 extending radially outwardly from and connected to each rotor disk 21. Each rotor disk 21 in turn may be coupled to or form an upstream portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, the compressor section 12 includes stator vanes disposed between the rotor blades to define a series of compression stages. The stator vanes may extend from, and couple to, a compressor casing.

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the downstream portion of the shaft 24 and the rotor blades 28. The turbine section 22 may include stationary nozzles 26 extending radially inward from the outer casing 32. The rotor blades 28 and stationary nozzles 26 may be arranged in alternating fashion in stages along an axial centerline 30 of gas turbine 10. Both the rotor blades 28 and the stationary nozzles 26 may include turbomachine airfoils that define an airfoil shape (e.g., having a leading edge, a trailing edge, and side walls extending between the leading edge and the trailing edge).

In operation, ambient air 36 or other working fluid is drawn into the inlet 16 of the compressor 14 and is progressively compressed to provide compressed air 38 to the combustion section 18. The compressed air 38 flows into the combustion section 18 and is mixed with fuel to form a combustible mixture. The combustible mixture is burned within a combustion chamber 40 of the combustor 20, thereby generating combustion gases 42 that flow from the combustion chamber 40 into the turbine section 22. Energy (kinetic and/or thermal) is transferred from the combustion gases 42 to the rotor blades 28, causing the shaft 24 to rotate and produce mechanical work. The combustion gases 42 exit the turbine section 22 and flow through the exhaust diffuser 34 across a plurality of struts 44 that are disposed within the exhaust diffuser 34.

The gas turbine engine 10 may define a cylindrical coordinate system having an axial direction A extending along the axial centerline 30, a radial direction R perpendicular to the axial centerline 30, and a circumferential direction C extending around the axial centerline 30.

Figure 2:
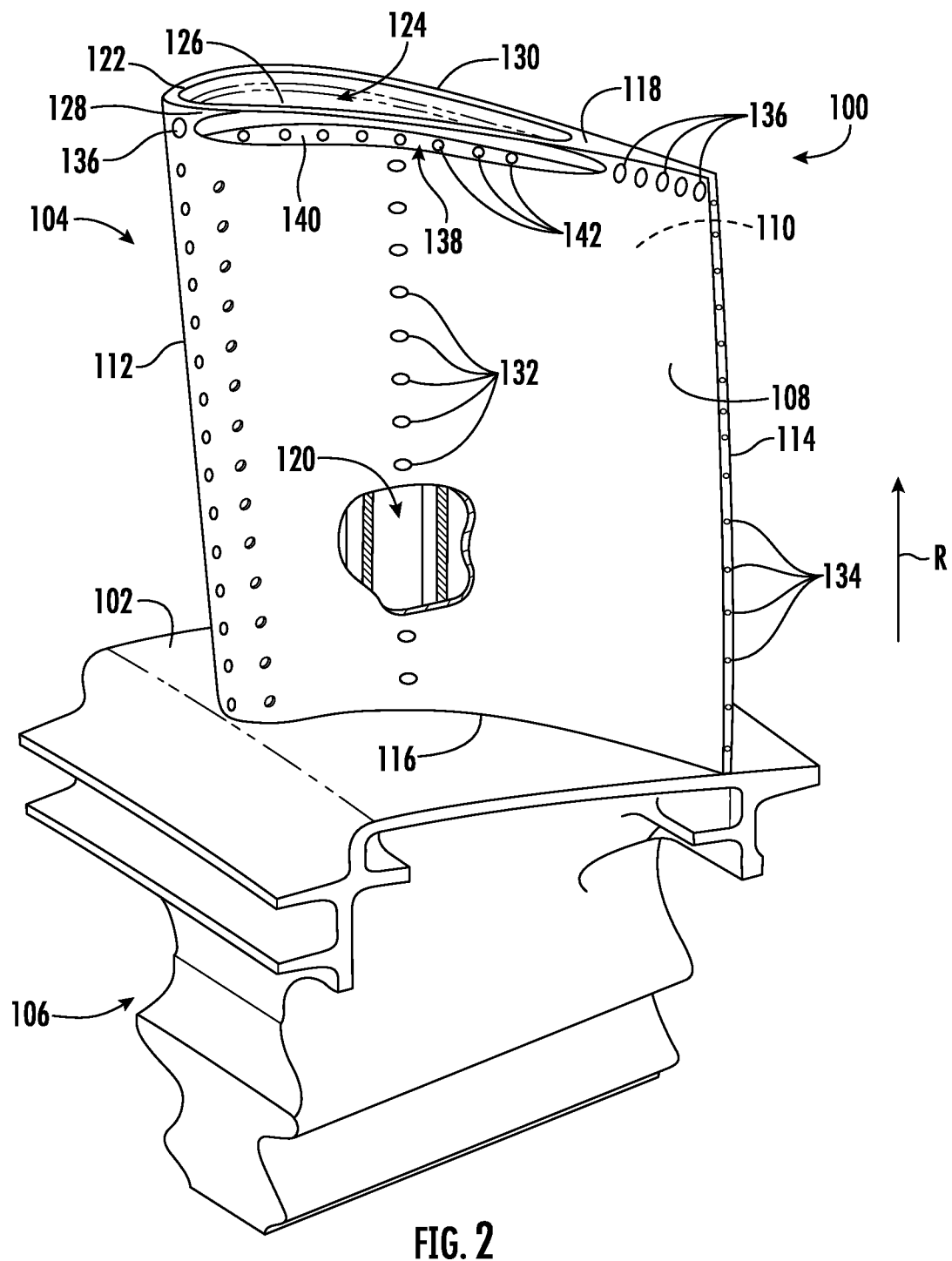
FIG. 2 illustrates a perspective view of a turbine component in accordance with exemplary aspects of the present disclosure.

Referring now to FIG. 2, a perspective view of a turbine component 100 is illustrated in accordance with exemplary aspects of the present disclosure, in which a portion of the pressure side wall 108 has been cut away to show the internal cooling passage(s) 120. In exemplary embodiments, the turbine component 100 may be a turbine blade. However, in other embodiments, the turbine component may be a turbine vane and/or a turbine nozzle. The turbine component 100 may be configured similarly to the rotor blades 28 in the turbine section 22 of the gas turbine 10 described above with reference to FIG. 1. As shown, the turbine component 100 includes a platform 102 disposed at the junction of airfoil 104 and a dovetail 106 for defining a portion of the radially inner flowpath for combustion gases.

The airfoil 104 may include a generally concave pressure sidewall 108 and an opposite, generally convex, suction sidewall 110. The pressure side wall 108 and the suction side wall 110 may each extend between a leading edge 112 and a trailing edge 114. Additionally, the pressure side wall 108 and the suction side wall 110 each extend radially (e.g., in the radial direction R) from a root 116 at the platform 102 to a tip 118. The airfoil 104 may terminate radially at the tip 118. In this way, the airfoil 104 may not include a tip shroud extending from the tip 118.

In accordance with an exemplary aspect of the present disclosure, the airfoil 104 may include a tip rail or edge rail 122 extending radially outwardly from the pressure side wall 108 and the suction side wall 110. The tip rail 122 may define a tip cavity 124, which may be shaped similarly to the airfoil 104. Particularly, the tip cavity 124 may be collectively defined by the tip rail 122 and a floor 126. The floor 126 may be radially inward of the tip 118. The tip rail 122 may extend radially outwardly from the floor 126 to the tip 118.

In many embodiments, the tip rail 122 may include a pressure side portion 128 and a suction side portion 130. The pressure side portion 128 may extend radially outwardly from the pressure side 108, and the suction side portion 130 may extend radially outwardly from the suction side 110.

Internal cooling channel(s) 120 may be defined within the airfoil 104, e.g., between the pressure side wall 108 and the suction side wall 110. The cooling air supplied to the internal cooling channel 120 may be bled from compressor section 12 in any conventional manner. The inside of airfoil 104 may have any configuration including, for example, serpentine flow channels with various turbulators formed therein for improving cooling air effectiveness. The cooling air from the internal cooling channel(s) 120 may be discharged through film cooling holes 132 defined in the side walls 108, 110 and/or trailing edge discharge holes 134 defined in the trailing edge 114. Additionally, one or more tip cooling passages 136 may be defined at least partially in the tip rail 122, such as in the pressure side portion 128 and/or the suction side portion 130.

In many embodiments, as shown, the tip rail 122 may define a tip shelf 138, which may include a floor 140. The tip shelf may be a recess defined in the pressure side portion 128 of the tip rail 122. The floor 140 may be generally perpendicular to the radial direction R. The floor 140 may define a plurality of shelf outlets 142, which discharge cooling air from the internal cooling channel(s) 120 in the radial direction R.

Figure 3:
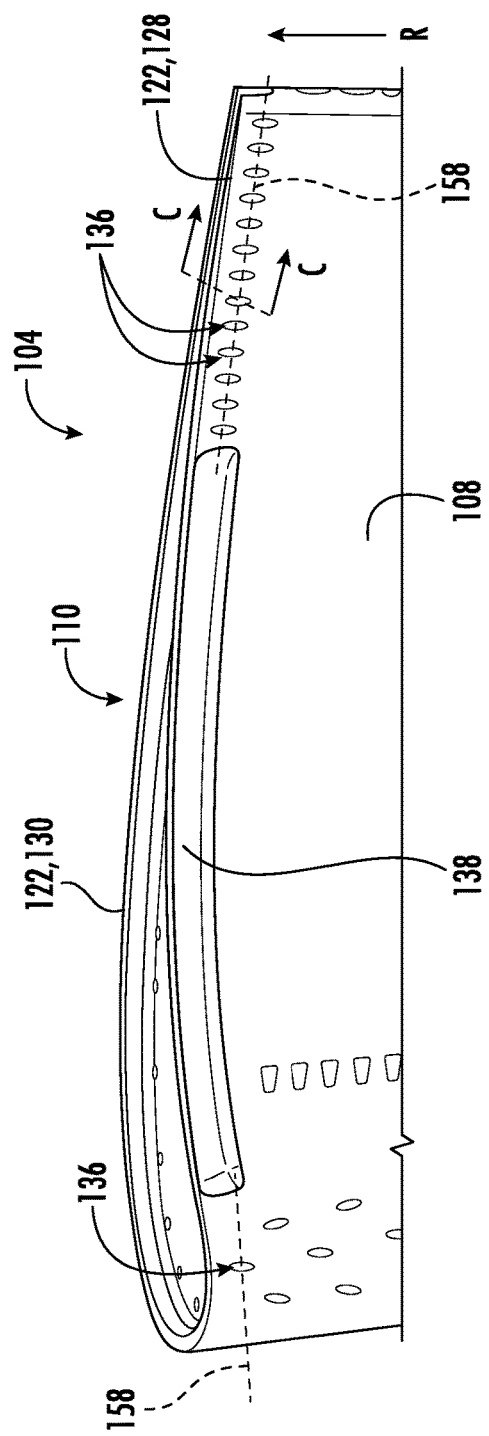
FIG. 3 illustrates illustrate an enlarged view of an airfoil of a turbine component in accordance with various aspects of the present disclosure.
Figure 4:
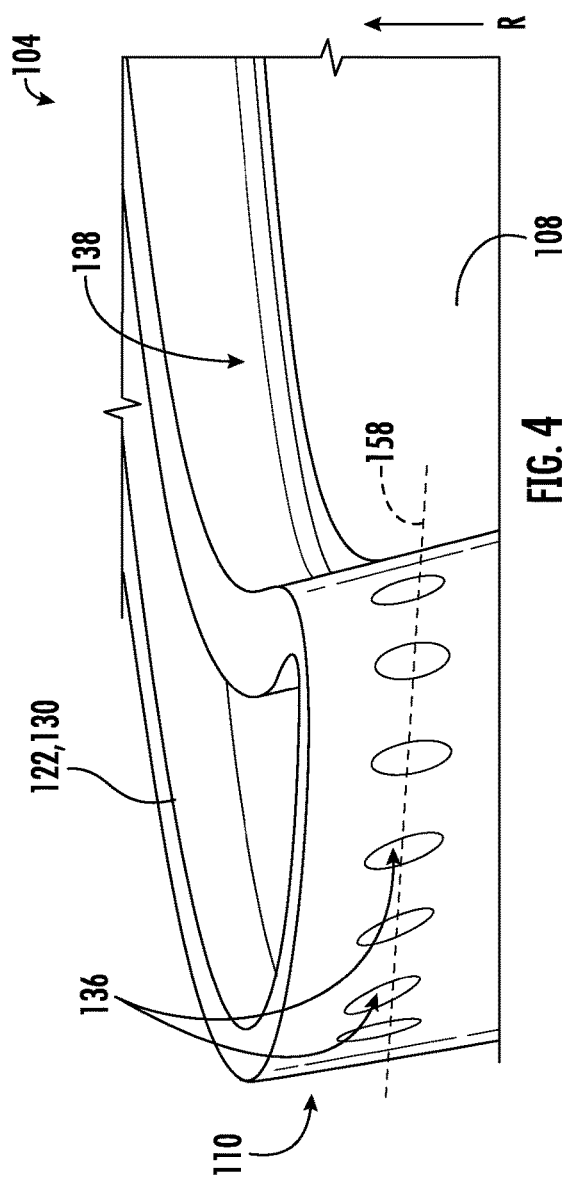
FIG. 4 illustrates illustrate an enlarged view of an airfoil of a turbine component in accordance with various aspects of the present disclosure.

Referring now to FIGS. 3 and 4, each of which illustrate an enlarged view of the airfoil 104 in accordance with various aspects of the present disclosure. As shown, the tip cooling passages 136 may be defined on the tip rail 122 in the pressure side portion 128 and/or in the suction side portion 130. Additionally, the tip cooling passages 136 may be equally spaced apart. The tip cooling passages 136 may each be disposed at the generally the same radial height (or span length) of the airfoil 104, such that each tip cooling passage 136 is disposed within about 0% to about 5% of a common radial height (or span length) of the airfoil 104.

Additionally, as shown, each of the tip cooling passages 136 may be elongated in the radial direction R, such that the longest dimension of each of the tip cooling passages 136 is generally parallel to the radial direction R. Specifically, each of the tip cooling passages 136 may be shaped as ovals, but other shapes are possible and within the scope of the present disclosure.

When in operation, the airfoil 104, including the tip rail 122, may be exposed to high temperature combustion gases, operational vibrations, and mechanical forces that cause the airfoil 104 to fall outside of a design specification range. Specifically, the tip rail 122 may lose material and/or warp over time due to operation and exposure to combustion gases thereby causing the tip rail 122 to fall outside of the design specification range (which is where peak efficiency occurs). The lost and/or warped material may be removed and built back up using an additive manufacturing process. As will be discussed below in further detail, this process includes machining the tip rail 122 to a machining stop line 158 such that a portion of the tip cooling passages 136 are exposed, adding new material with an additive manufacturing system, and machining the new material such that the tip rail is back within a design specification range.

Referring now to FIGS. 5 through 8, each of which illustrate a cross-sectional schematic view of the airfoil 104 from along the line C-C shown in FIG. 3, in accordance with embodiments of the present disclosure. Particularly, FIGS. 5 through 8 each illustrate a cross-sectional view of the airfoil 104 in various steps of a repair process. As shown in FIGS. 5 through 8, the airfoil 104 may include a pressure side wall 108 and a suction side wall 110. The airfoil 104 may include a tip rail 122 having a pressure side portion 128 extending (e.g., radially) from the pressure side wall 108 and a suction side portion 130 extending (e.g., radially) from the suction side wall 110. The tip rail 122 and a cap 125 (which defines a floor 126) may define a tip cavity 124.

An internal cooling channel 120 may be defined within the airfoil 104 (e.g., between the pressure side wall 108, the suction side wall 110, and the cap 125). A tip cooling passage 136 may extend from the internal cooling channel 120. Particularly, the tip cooling passage 136 may include a counterbore hole 146 and a through hole 148. The counterbore hole 146 may be defined in the tip rail 122, and the through hole may be defined in both the tip rail 122 and/or the pressure side wall 108. The through hole 148 may extend from the internal cooling channel 120 to the counterbore hole 146, and the counterbore hole 146 may extend from the through hole 148 to an exterior surface 150 of the airfoil 104 on the pressure side 108. Additionally, the counterbore hole 146 may extend radially beyond the through hole 148. The airfoil 104 may include a radially outermost surface 153, and the counterbore hole 146 may be radially spaced apart from the radially outermost surface 153 (e.g., prior to the repair process). The counterbore hole 146 may have a larger diameter than the through hole 148. While FIGS. 5 through 8 illustrate a tip cooling passage 136 defined on the pressure side, it should be appreciated that tip cooling passages 136 may also be disposed on the suction side.

Figure 5:
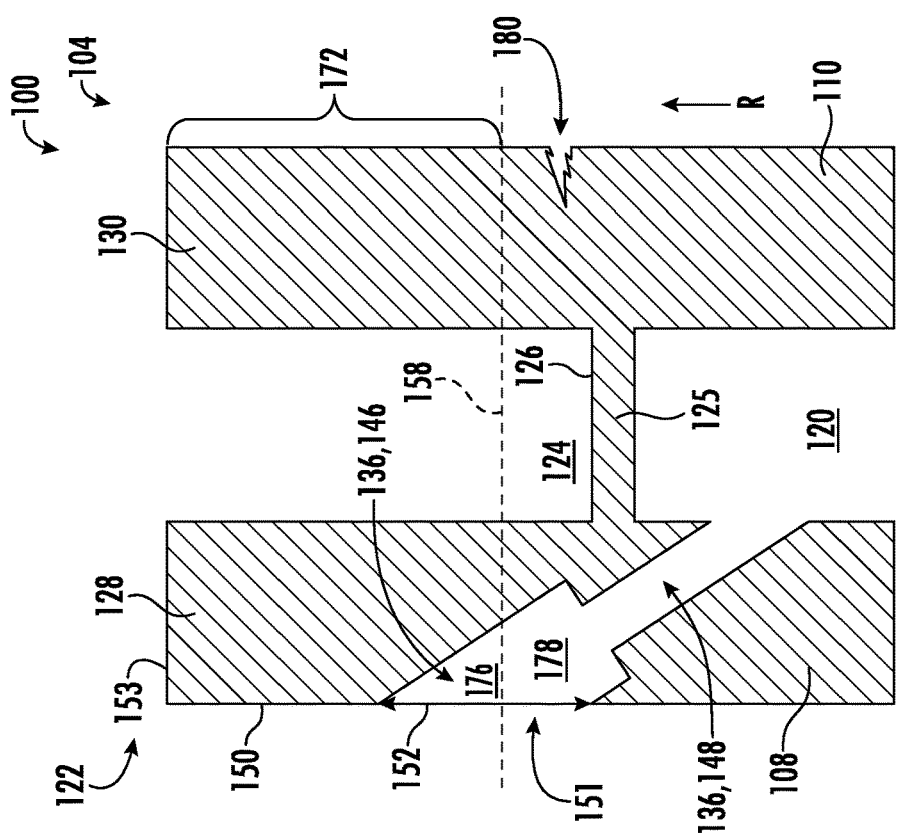
FIG. 5 illustrates a cross-sectional schematic view of the airfoil from along the line C-C shown in FIG. 3 at a first stage of a repair process, in accordance with embodiments of the present disclosure.

FIG. 5 illustrates a cross-sectional view of the airfoil 104 of the turbine component 100 prior to having been machined down to remove a tip portion 172 that may be worn/warped. In this state, the airfoil 104 may have undergone at least one operational cycle (such as in the gas turbine 10 discussed above with reference to FIG. 1), such that the tip portion 172 of the tip rail 122 is worn and/or warped and has fallen out of a design specification range. The design specification range may correspond with a peak efficiency range of the airfoil 104. That is, the design specification range is the aerodynamic profile and/or contour that extracts the most energy from the combustion gases when implemented in a gas turbine 10. As such, the repair method disclosed herein advantageously restores the tip portion 172 of the tip rail 122 of the airfoil 104 to the design specification range by removing the warn/warped material and adding back new material through laser deposition and/or additive manufacturing. As shown in FIG. 5, the counterbore hole 146 of the tip cooling passage 136 may define a pre-machined radial height 152. The pre-machined radial height 152 may be defined at an opening 151 of the counterbore hole 146 on the exterior surface 150 of the airfoil 104.

Figure 6:
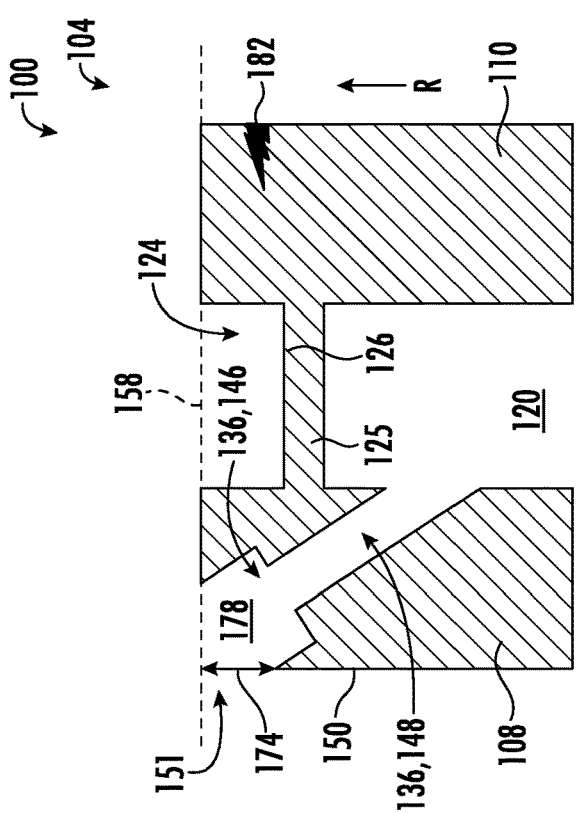
FIG. 6 illustrates a cross-sectional schematic view of the airfoil from along the line C-C shown in FIG. 3 at a second stage of a repair process, in accordance with embodiments of the present disclosure.

In accordance with exemplary implementations of the repair method, the method may include removing (e.g., through a machining or subtractive process) the tip portion 172 of the tip rail 122, such that a portion of the counterbore hole 146 is removed and the through hole 148 remains (e.g., intact and unmachined). Specifically, the method may include removing the tip portion 172 of the tip rail 122 such that a workpiece interface 220 (or top surface) is defined at a radially outer end of the airfoil 104. As shown in FIG. 6, after removing the tip portion 172 at least one tip cooling passage 136 of the plurality of tip cooling passages extends to an opening 170 on the workpiece interface 220 (e.g., at least partially defined by the workpiece interface 220). More specifically, as shown, after the removing the tip portion 172, the counterbore hole 146 may be exposed and may extend to the opening 170 on the workpiece interface 220.

As shown in FIG. 5, a machining stop line 158 may be disposed at about half of the pre-machined radial height 152 of the counterbore hole 146. The machining stop line 158 may also be seen in FIGS. 3 and 4. This line may represent the portion of the tip cooling passage 136 that is removed prior to further implementation of the repair method. Specifically, radially outward of the machining stop line 158 may be removed. The machining stop line 158 may form a portion of a machining stop plane, which may be perpendicular to the radial direction R.

The machining stop line 158 may be disposed between about 40% and about 60% of the pre-machined radial height 152. In other embodiments, the machining stop line 158 may be disposed between about 45% and about 55% of the pre-machined radial height 152. In certain embodiments, the machining stop line 158 may be disposed at about 50% of the pre-machined radial height 152.

Stated otherwise, once the tip portion 172 is removed (e.g., machined away) a remaining radial height 174 of the counterbore hole 146 may remain. The remaining radial height 174 may be the radial height of the counterbore hole 146 at the opening 151 . . . . Once the tip portion 172 is removed, the remaining radial height 174 may be between about 40% and about 60% of the pre-machined radial height 152, or such as between about 45% and about 55%, or such as about 50%.

FIG. 6 illustrates the airfoil 104 after having the tip portion 172 of the tip rail 122 removed (e.g., the portion of the tip rail 122 radially outward of the of the machining stop line 158). At this stage, the airfoil 104 may define a workpiece interface 220 (or top surface). The workpiece interface 220 may define an opening 170 to which the remaining portion of the counterbore hole 146 of the tip cooling passage 136 extends. That is, after the worn portion of the tip rail 122 is removed, a remainder of the counterbore hole 146 may extend radially outwardly to an opening 170 on the workpiece interface 220.

As shown in FIGS. 5 and 6 collectively, the counterbore hole may include a top segment 176 (or radially outer segment) and a bottom segment 178. The top segment 176 may be radially outward of the machining stop line 158, and the bottom segment 178 may be radially inward of the machining stop line 158. The repair method may include removing the tip portion 172 of the tip rail 122 such that the top segment 176 of the counterbore hole 146 is removed and the bottom segment 178 of the counterbore hole extends radially to the opening 170 on the workpiece interface 220.

As shown in FIGS. 5 through 8, in some implementations, the airfoil 104 may include one or more defects 180 (as shown in FIG. 5), or surface cracks, formed as a result of operation within the gas turbine. In such implementations, the repair method may include welding (e.g., manually welding) the defects 180 to generate a welded defect 182 (FIGS. 6 through 8) and blending the welded defect flush with the tip rail 122 (e.g., flush with the exterior surface of the tip rail 122).

Figure 7:
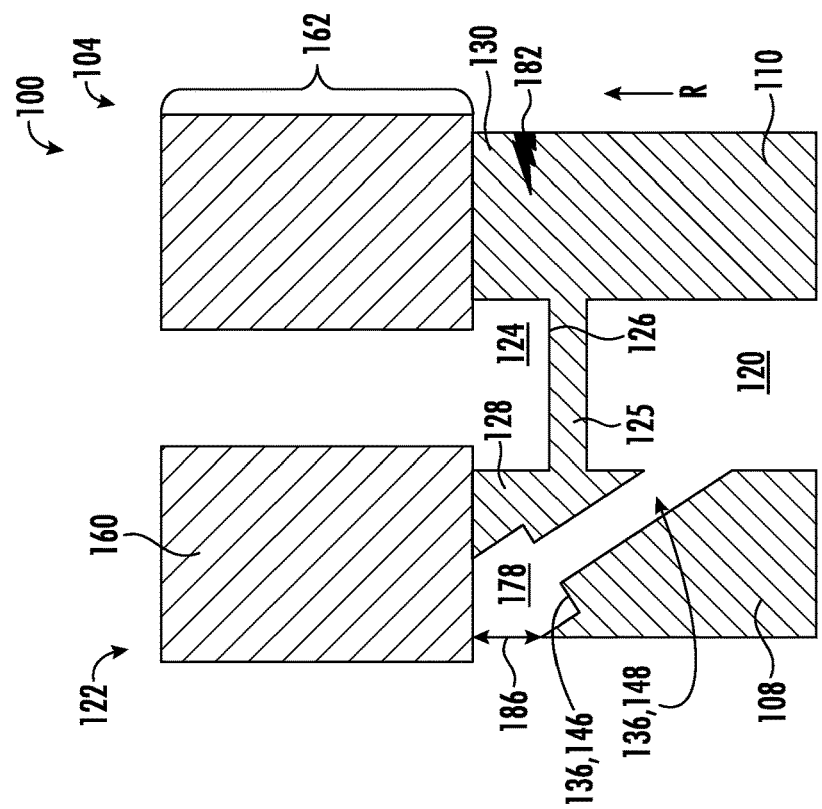
FIG. 7 illustrates a cross-sectional schematic view of the airfoil from along the line C-C shown in FIG. 3 at a third stage of a repair process, in accordance with embodiments of the present disclosure.

FIG. 7 illustrates the airfoil 104 after having undergone additive manufacturing and/or laser deposition, in which new material 160 in the form of an extension segment 162 has been added to the airfoil 104. The extension segment 162 may extend across the opening 170. The extension segment 162 may roughly fit the original contour of the airfoil 104 (e.g., when the airfoil 104 was originally manufactured prior to use in a gas turbine), but the extension segment 162 may require additional post-machining to return the tip rail 122 to the design specification range. The extension segment 162 may be added onto the airfoil 104 at the workpiece interface 220 by the additive manufacturing system 200 discussed below with reference to FIG. 9. After additive manufacturing (or printing), the counterbore 146 may define a post-printing height 186 that is approximately equal to the remaining radial height 174. Post machining (such as drilling, boring, or utilizing an electrical discharge machine) may be required to re-open the top segment of the counterbore hole 146.

Figure 8:
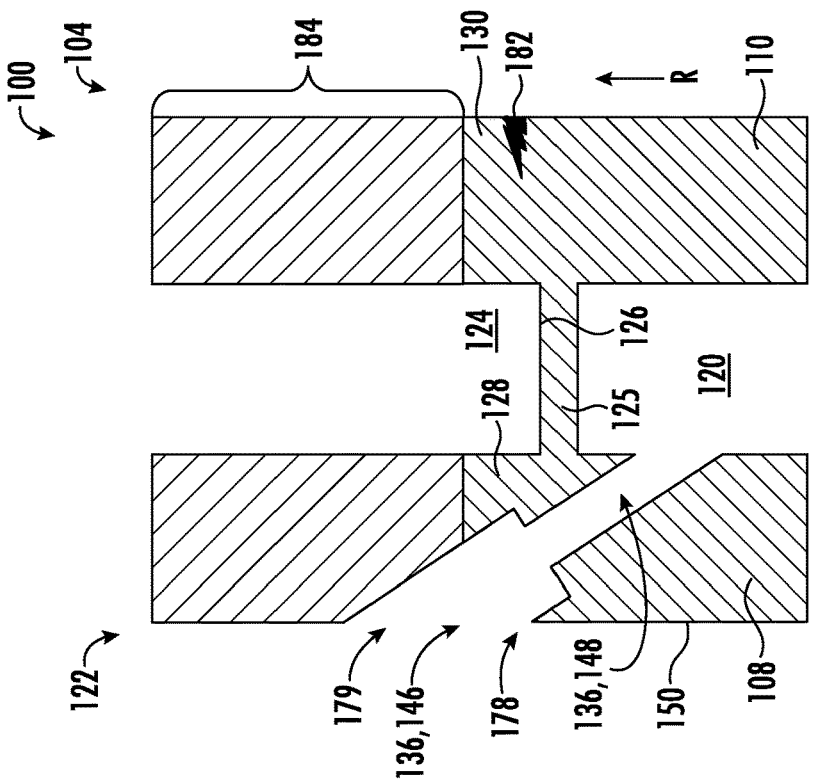
FIG. 8 illustrates a cross-sectional schematic view of the airfoil from along the line C-C shown in FIG. 3 at a fourth stage of a repair process, in accordance with embodiments of the present disclosure.

FIG. 8 illustrates the airfoil 104 after undergoing post machining to form a replacement tip portion 184 that is within the design specification range. The replacement tip portion 184 may generally fit the contour of the tip portion 172, but may not be worn/warped such that the replacement tip portion 184 is within the design specification range. During the post machining, the new material 160 is partially removed to bring the airfoil 104 back within the design specification range and/or the counterbore hole 146 is re-opened. Particularly, the repair method may include re-opening the counterbore hole 146 (e.g., the top segment of the counterbore hole) by removing a portion of the extension segment 162. The portion removed may correspond with the size/shape of the top segment 176, such that a new top segment 179 of the counterbore hole 146 is formed within the extension segment 162.

Figure 9:
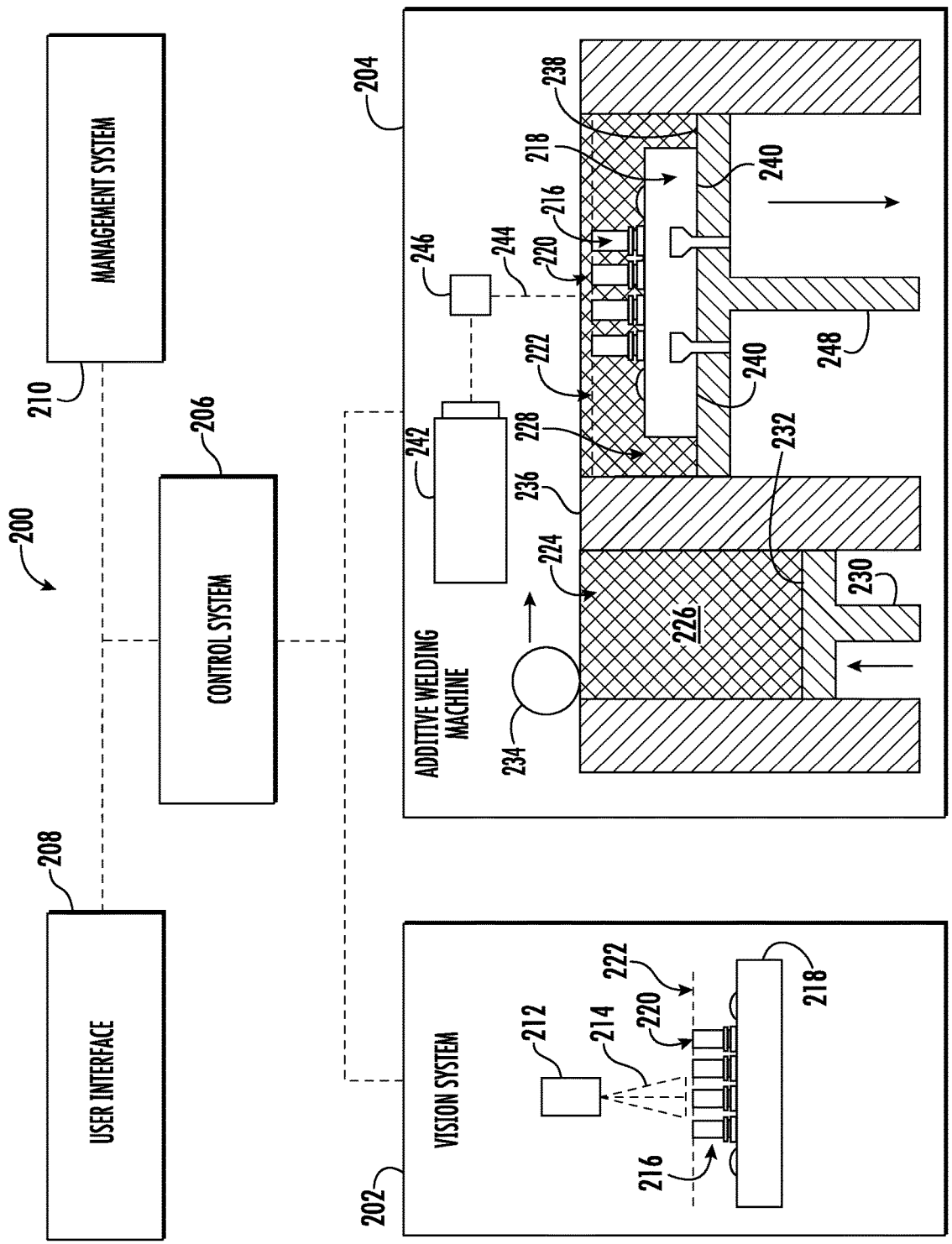
FIG. 9 illustrates a schematic view of an exemplary additive manufacturing system in accordance with exemplary aspects of the present disclosure.

Referring now to FIG. 9, an exemplary additive manufacturing system 200 is illustrated in accordance with exemplary aspects of the present disclosure. As shown, the additive manufacturing system 200 includes a vision system 202, an additive welding machine 204, and a control system 206 operably configured to control the vision system 202 and/or the additive welding machine 204. The vision system 202 and the additive welding machine 204 may be provided as a single, integrated unit or as separate stand-alone units. The vision system 202 and the additive welding machine 204 may be operably coupled with one another via a communication interface utilizing wired or wireless communication lines, which may provide a direct connection between the vision system 202 and the additive welding machine 204. The control system 206 may include one or more control systems 206. For example, a single control system 206 may be operably configured to control operations of the vision system 202 and the additive welding machine 204, or separate control systems 206 may be operably configured to respectively control the vision system 202 and the additive welding machine 204. A control system 206 may be realized as part of the vision system 202, as part of the additive welding machine 204, and/or as a stand-alone unit provided separately from the vision system 202 and/or the additive welding machine 204. A control system 206 may be operably coupled with the vision system 202 and/or the additive welding machine 204 via a communication interface utilizing wired or wireless communication lines, which may provide a direct connection between the control system 206 and the vision system 202 and/or between the control system 206 and the additive welding machine 204. An exemplary additive manufacturing system 200 may optionally include a user interface 208 and/or a management system 210.

In some embodiments, the control system 206 may determine an extension segment-CAD model, generate one or more print commands based at least in part on the extension segment-CAD model, and/or transmit the one or more print commands to cause the additive welding machine 204 to additively print the extension segments based at least in part on the print commands.

The vision system 202 may include any suitable camera or cameras 212 or other machine vision device that may be operably configured to obtain image data that includes a digital representation of one or more fields of view 214. Such a digital representation may sometimes be referred to as a digital image or an image; however, it will be appreciated that the present disclosure may be practiced without rendering such a digital representation in human-visible form. Nevertheless, in some embodiments, a human-visible image corresponding to a field of view 214 may be displayed on the user interface 208 based at least in part on such a digital representation of one or more fields of view 214.

The vision system 202 allows the additive manufacturing system 200 to obtain information pertaining to one or more workpieces 216 onto which one or more extension segments may be respectively additively printed. In particular, the vision system 202 allows the one or more workpieces 216 to be located and defined so that the additive welding machine 204 may be instructed to print one or more extension segments on a corresponding one or more workpieces 216 with suitably high accuracy and precision. The one or more workpieces 216 may be secured to a build plate 218 with a workpiece-interface (e.g. a top surface) 220 of the respective workpieces 216 aligned to a build plane 222.

The one or more cameras 212 of the vision system 202 may be configured to obtain two-dimensional or three-dimensional image data, including a two-dimensional digital representation of a field of view 214 and/or a three-dimensional digital representation of a field of view 214. Alignment of the workpiece-interfaces 220 with the build plane 222 allows the one or more cameras 212 to obtain higher quality images. For example, the one or more cameras 212 may have a focal length adjusted or adjustable to the build plane 222. With the workpiece-interface 220 of one or more workpieces 216 aligned to the build plane 222, the one or more cameras may readily obtain digital images of the workpiece-interfaces 220. The one or more cameras 212 may include a field of view 214 that that encompasses all or a portion of the one or more workpieces 216 secured to the build plate 218.

Image data obtained by the vision system 202, including a digital representation of one or more workpieces 216 may be transmitted to the control system 206. The control system 206 may be configured to determine a workpiece-interface 220 of each of a plurality of workpieces 216 from one or more digital representations of one or more fields of view 214 having been captured by the vision system 202, and then determine one or more coordinates of the workpiece-interface 220 of respective ones of the plurality of workpieces 216. Based on the one or more digital representations, the control system 206 may generate one or more print commands, which may be transmitted to an additive welding machine 204 such that the additive welding machine 204 may additively print a plurality of extension segments on respective ones of the plurality of workpieces 216. The one or more print commands may be configured to additively print a plurality of extension segments with each respective one of the plurality of extension segments being located on the workpiece-interface 220 of a corresponding workpiece 216.

The additive welding machine 204 may utilize any desired additive manufacturing technology. In an exemplary embodiment, the additive welding machine may utilize a powder bed fusion (PBF) technology, such as direct metal laser melting (DMLM), electron beam melting (EBM), selective laser melting (SLM), directed metal laser sintering (DMLS), or selective laser sintering (SLS). In some embodiments, the additive welding machine 204 may utilize a wire feeding rod instead of, or in addition to, the powder bed. Further, in other embodiments, the extension segment may be done entirely manually with a welding torch and wire rod, such that the additive manufacturing machine 204 may not be necessary.

Still referring to FIG. 9, an exemplary additive welding machine 204 includes a powder supply chamber 224 that contains a supply of powder 226, and a build chamber 228. A build plate 218 having one or more workpieces 216 secured thereto may be positioned in the build chamber 228, where the workpieces 216 may be additively printed in a layer-by-layer manner. The powder supply chamber 224 includes a powder piston 230 which elevates a powder floor 232 during operation of the system 200. As the powder floor 232 elevates, a portion of the powder 226 is forced out of the powder supply chamber 224.

A recoater 234, such as a roller or a blade, pushes some of the powder 226 across a work surface 236 and onto a build platform 238. The build plate 218 may be secured to the build platform 238 with a chuck system 240 in a manner configured to position the build plate 218 on the build platform 238 and/or within the build chamber 228 with sufficiently high accuracy and precision. The workpieces 216 may be secured to the build plate 218 prior to securing the build plate 218 to the build platform 238. The recoater 234 fills the build chamber 228 with powder 226 and then sequentially distributes thin layers of powder 226 across a build plane 222 near the top of the workpieces 216 to additively print sequential layers of the workpieces 216. For example, the thin layers of powder 226 may be about 10 to 100 microns thick, such as about 20 to 80 μm thick, such as about 40 to 60 μm thick, or such as about 20 to 50 μm thick, or such as about 10 to 30 μm thick. The build plane 222 represents a plane corresponding to a next layer of the workpieces 216 to be formed from the powder 226.

To form a layer of an extension segment on the workpiece 216 (e.g., an interface layer or a subsequent layer), an energy source 242 directs an energy beam 244 such as a laser or an electron beam onto the thin layer of powder 226 along the build plane 222 to melt or fuse the powder 226 to the top of the workpieces 216 (e.g., to melt or fuse a layer to the workpiece-interfaces 220 and/or melt or fuse subsequent layers thereto). A scanner 246 controls the path of the beam so as to melt or fuse only the portions of the powder 226 layer that are to become melted or fused to the workpieces 216. Typically, with a DMLM, EBM, or SLM system, the powder 226 is fully melted, with respective layers being melted or re-melted with respective passes of the energy beam 244. Conversely, with DMLS, or SLS systems, layers of powder 226 are sintered, fusing particles of powder 226 with one another generally without reaching the melting point of the powder 226. After a layer of powder 226 is melted or fused to the workpieces 216, a build piston 248 gradually lowers the build platform 238 by an increment, defining a next build plane 222 for a next layer of powder 226 and the recoater 234 to distributes the next layer of powder 226 across the build plane 222. Sequential layers of powder 226 may be melted or fused to the workpieces 216 in this manner until the additive printing process is complete.

Figure 10:
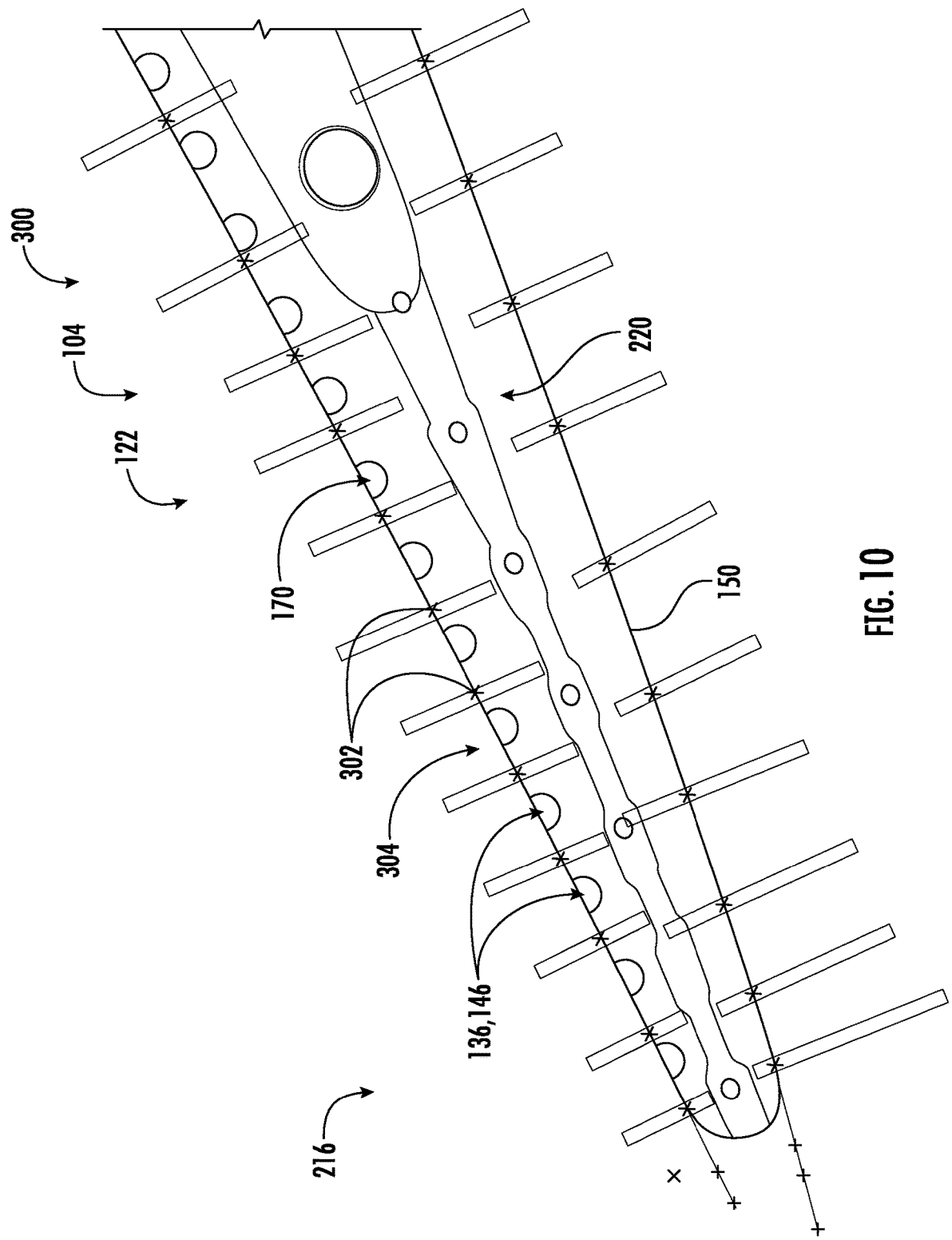
FIG. 10 depicts a digital representation of a field of view, which may be captured by a vision system of the additive manufacturing system of FIG. 9, in accordance with exemplary aspects of the present disclosure.

FIG. 10 depicts a digital representation 300 of a field of view 214 that includes a workpiece interface 220 of a workpiece 216. Specifically, FIG. 10 depicts a digital representation 300 of a field of view 214 in which the workpiece 216 is a portion of the tip rail 122 of an airfoil 104. The digital representation 300 of the tip rail 122 may be taken by the vision system 202 after the tip cooling passage(s) 136 have been exposed by removing the worn material from the tip rail 122, such that the plurality of tip cooling passages 136 are visible on the workpiece interface 220 in the digital representation 300. For example, digital representation 300 of the airfoil 104 may be taken when the airfoil is in the state shown in FIG. 6, such that the openings 170 are visible on the workpiece interface 220.

The vision system 202 may provide the digital representation 300 to the control system 206 of the workpiece interface 220, which may generate and/or position a plurality of digital markers 302 on the digital representation 300 along the perimeter of the tip rail 122 on the workpiece interface 220. The digital markers 302 may be generatively positioned by the control system 206 or manually positioned by a user with the user interface 208. A smooth line may connect each of the digital markers 302 to create a digital profile 304 of the airfoil 104. The digital markers 302 may provide the profile 304 of the airfoil 104 at the workpiece interface 220 to the control system 206 and/or the additive welding machine 204. Subsequently, the control system 206 may instruct the additive welding machine 204 to add material to the tip rail 122 by having the powder deposition and/or laser follow the profile 304 (e.g., the path of the lines connecting the digital markers 302). The digital markers 302 may be positioned on the exterior surface 150 of the airfoil 104 on the workpiece profile 220. Specifically, the digital markers 302 may be positioned between the plurality of openings 170 (i.e., the counterbore hole 146 of the tip cooing passages 136, which is exposed on the workpiece interface 220 due to the removal of the tip rail 122 earlier in the repair procedure). A digital marker 302 may be positioned between two neighboring tip cooling passages 136. Positioning the digital markers 302 in this manner is advantageous because it provides for a more accurate profile 304 of the airfoil 104 to be generated than if, e.g., the tip cooling passages 136 were not visible (e.g., if the tip cooling passages were welded shut and thus not visible, such that the digital markers 302 could not be positioned relative thereto).

Figure 11:
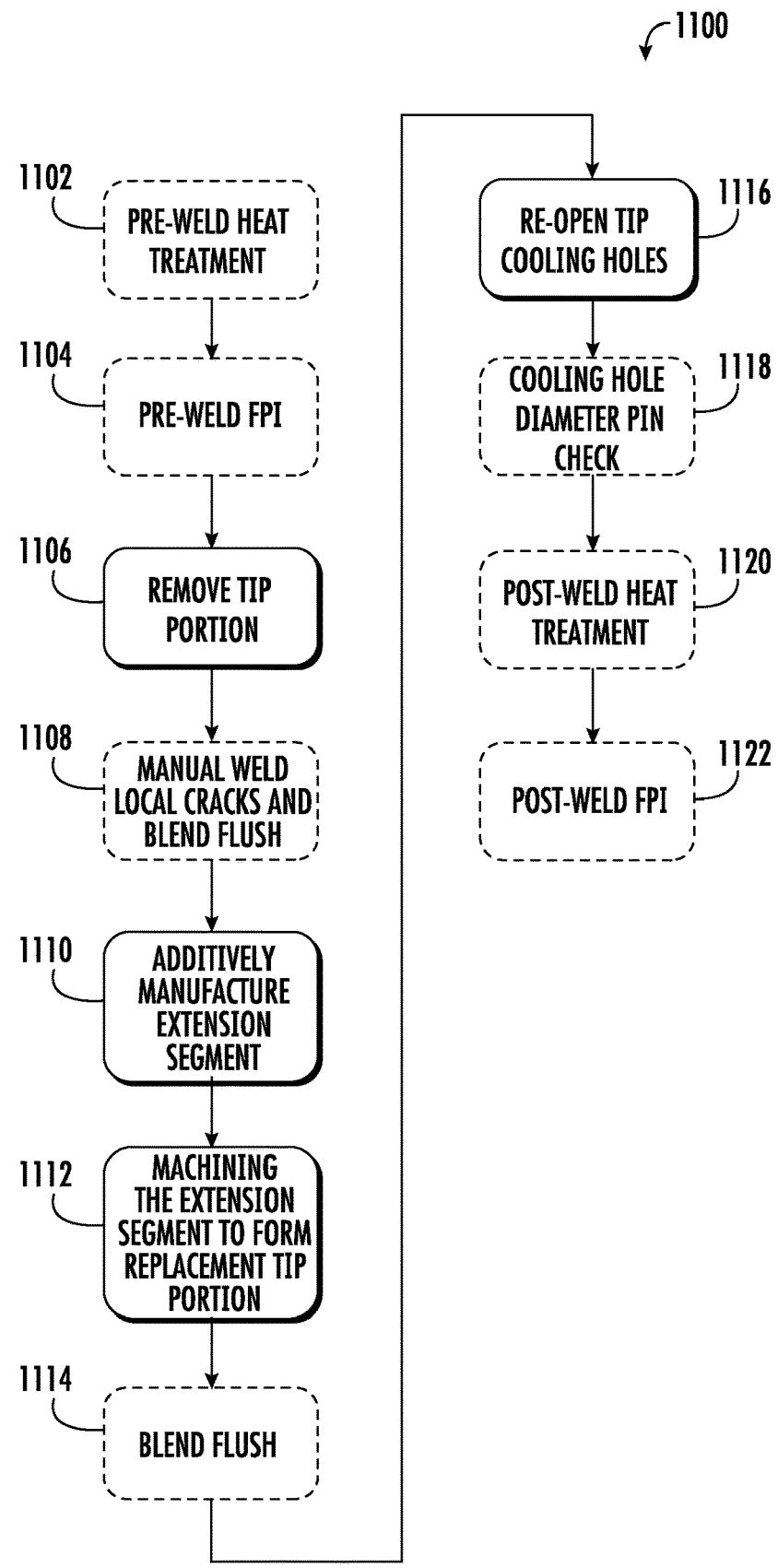
FIG. 11 illustrates a flow diagram of a method of repairing an airfoil of a turbine component in accordance with embodiments of the present disclosure.

Referring now to FIG. 11, a flow diagram of one embodiment of a method 1100 of repairing an airfoil of a turbine component is illustrated in accordance with embodiments of the present subject matter. In general, the method 1100 will be described herein with reference to the turbine component 100, the airfoil 104, and the additive manufacturing system 200, described above with reference to FIGS. 1-10. However, it will be appreciated by those of ordinary skill in the art that the disclosed method 1100 may generally be utilized with any turbine component and/or may be utilized in connection with a additive manufacturing system having any other suitable system configuration. In addition, although FIG. 11 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure. Dashed boxes indicate optional steps of the method 1100.

As shown in FIG. 11, the method of repairing an airfoil may include, at (1102), subjecting the airfoil of the turbine component to pre-weld heat treatment. This may involve heating the airfoil to a set temperature to relieve stress or remove hydrogen prior to welding any cracks or defects to ensure better weld quality. In many implementations, the method 1100 may include at (1104) performing pre-weld fluorescent penetrant inspection (FPI) on the airfoil. The pre-weld FPI may reveal defects not visible to the naked eye. This process may involve preparing the surface by cleaning, applying a fluorescent penetrant, allowing the penetrant to dwell over a time period, removing excess penetrant, and UV inspection. The part is inspected under a UV light, which reveals any cracks into which the penetrant has flowed thereby revealing the defects.

In exemplary implementations, the method 1100 may include at (1106) removing the tip portion of the airfoil. This may form a workpiece interface onto which a replacement tip may be additively manufactured. Removing at (1106) may be done using any conventional machining process, such as turning, milling, drilling, grinding, boring, broaching, Electrical Discharge Machining (EDM), Electron Beam Machining (EBM), laser cutting, waterjet cutting, chemical machining, ultrasonic machining, or other machining processes.

Either prior to step 1106 or after step 1106, the method 1100 may include, at (1108) manually welding local cracks (or defects) in the airfoil and blending flush. This may include filling any local defects in the airfoil with weld material and blending (e.g., grinding, sanding, or other blending techniques). Blending the welded defect flush may ensure that there are no protrusions between the surface of the airfoil and the welded defect.

In many implementations, the method 1100 may further include at (1110) additively manufacturing an extension segment onto the workpiece interface of the airfoil. This may be performed by an additive manufacturing system (such as the additive manufacturing system 200 discussed above with reference to FIG. 9). The extension segment may roughly match the contour of the removed portion of the airfoil, but may require some final machining/blending to bring the airfoil back within a design specification range. As such, the method 1100 may further include at (1112) machining the extension segment to form a replacement tip portion. Machining at (1112) may be done using any conventional machining process, such as turning, milling, drilling, grinding, boring, broaching, Electrical Discharge Machining (EDM), Electron Beam Machining (EBM), laser cutting, waterjet cutting, chemical machining, ultrasonic machining, or other machining processes. Additionally, the method 1100 may include at (1114) blending the replacement tip portion flush with the airfoil 104, which may ensure no protrusions are present at the intersection between the replacement tip portion and the airfoil. Blending may include sanding or other techniques.

In various implementations, the method 1100 may include at (1116) re-opening the tip cooling holes. For example, during the removing step, the tip cooling holes may have been partially removed, such that during the additive manufacturing step, the tip cooling holes are covered by the extension segment. As such, the tip cooling holes may be re-opened by removing a portion of the extension segment. Removing a portion of the extension segment may include machining (such as drilling or boring) the tip cooling holes. In some implementations, removing the portion of the extension segment to re-open the tip cooling holes may include utilizing an EDM process. Subsequently, the method may include at (1118) checking the cooling hole diameter with a reference pin. For example, this may include inserting a reference pin into the cooling hole to ensure the cooling hole diameter is within a desired range. If not, the cooling hole may require additional machining. In many implementations, the method 1100 may include at (1120) post-weld heat treatment. This may involve heating the airfoil to a set temperature to relieve stress. Lastly, the method 1100 may include at (1122) post-weld fluorescent penetrant inspection (FPI) on the airfoil using a similar process as described above with reference to step 1104.

Figure 12:
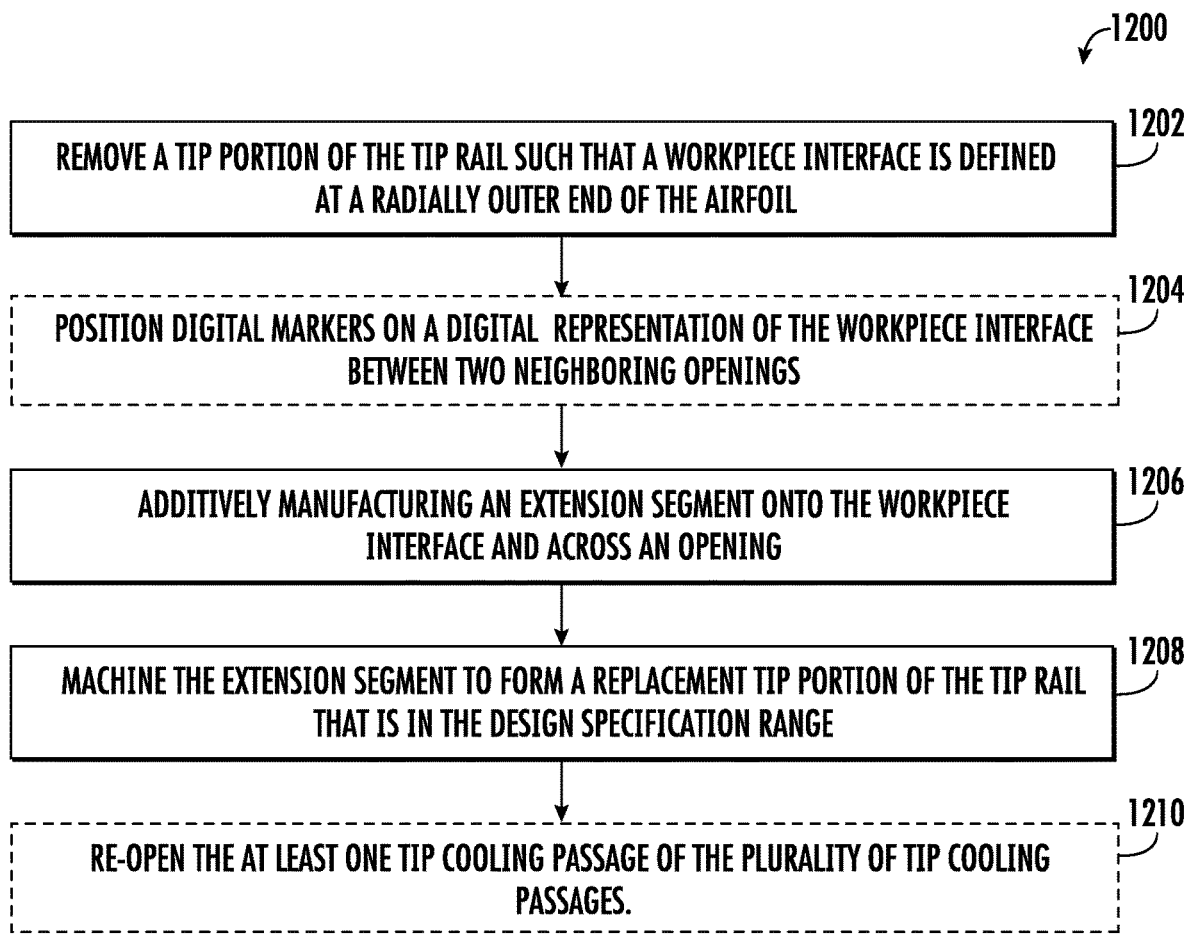
FIG. 12 illustrates a flow diagram of a method of repairing an airfoil of a turbine component in accordance with embodiments of the present disclosure.

Referring now to FIG. 12, a flow diagram of one embodiment of a method 1200 of repairing an airfoil of a turbine component is illustrated in accordance with embodiments of the present subject matter. In general, the method 1200 will be described herein with reference to the turbine component 100, the airfoil 104, and the additive manufacturing system 200, described above with reference to FIGS. 1-10. However, it will be appreciated by those of ordinary skill in the art that the disclosed method 1200 may generally be utilized with any turbine component and/or may be utilized in connection with a additive manufacturing system having any other suitable system configuration. In addition, although FIG. 12 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure. Dashed boxes indicate optional steps of the method 1200.

The method 1200 may be for repairing an airfoil of a turbine component. The airfoil may include a tip rail that at least partially defines a plurality of tip cooling passages. The turbine component may have undergone at least one operational cycle such that a tip portion of the tip rail is outside of a design specification range. For example, when in operation, the airfoil, including the tip rail, may be exposed to high temperature combustion gases, operational vibrations, and mechanical forces that cause the tip portion to fall outside of a design specification range. Specifically, the tip portion may lose material and/or warp over time due to operation and exposure to combustion gases thereby causing the tip portion of the tip rail to fall outside of the design specification range (which is where peak efficiency occurs).

The method 1200 may include at (1202) removing the tip portion of the tip rail such that a workpiece interface is defined at a radially outer end of the airfoil. As a result, after removing the tip portion, at least one tip cooling passage of the plurality of tip cooling passages extends to an opening on the workpiece interface (such as all of the tip cooling passages in some implementations, or such as a portion of the tip cooling passages in other implementations). In many implementations, prior to the removing step at (1202), the plurality of tip cooling passages each comprises a through hole and a counterbore extending from the through hole and radially beyond the through hole. In such implementations, the method 1200 may include removing the tip portion of the tip rail such that the counterbore hole extends radially to the opening on the workpiece interface. In various implementations, the method 1200 may include removing the tip portion of the tip rail such that a top segment of the counterbore hole is removed and a bottom segment of the counterbore hole extends radially to the opening on the workpiece interface.

More specifically, prior to the removal step, the counterbore hole may define a pre-machined radial height. In such embodiments, the method may include removing the tip portion of the tip rail such that a remaining radial height of the counterbore is between about 40% and about 60% of the pre-machined radial height, or such as between about 45% and about 55%, or such as about 50%.

In exemplary implementations, the method 1200 may include at (1206) additively manufacturing an extension segment onto the workpiece interface and across the opening (or across all the openings in embodiments where each of the tip cooling holes is exposed after removal of the tip portion). In many implementations, additively manufacturing at (1206) is performed with an additive manufacturing system. The additive manufacturing system may includes a vision system operably connected to an additive welding machine, a control system, and a user interface. In such embodiments, the method 1200 may include at (1204) positioning digital markers on a digital representation of the workpiece interface between two neighboring openings after the removing step, the digital representation being captured by the vision system. Positioning at (1204) may be done manually by a user with the user interface or automatically by the control system. Positioning at (1204) may be after removing at (1202) and before the additively manufacturing at (1206). For example, the digital markers may be positioned after the removal step because the openings will be exposed and therefore visible by the vision system. This advantageously increases the accuracy and precision of the additive manufacturing step, resulting in less defects in the printed extension segment.

In various embodiments, the method 1200 may include at (1208) machining the extension segment to form a replacement tip portion of the tip rail that is within the design specification rang. Additionally, the method 1200 may include at (1210) re-opening the at least one tip cooling passage of the plurality of tip cooling passages (e.g., by removing a portion of the extension segment).

Importantly, in exemplary implementations, prior to removing at (1202) and prior to additively manufacturing at (1206) no weld material may be disposed in the tip cooling passage (such as in the counterbore hole and/or the through hole). This advantageously allows the openings to be visible on the workpiece interface, which allows the digital markers to be positioned relative to the openings, thereby resulting in a more efficient additive manufacturing of the extension segment.

Figure 13:
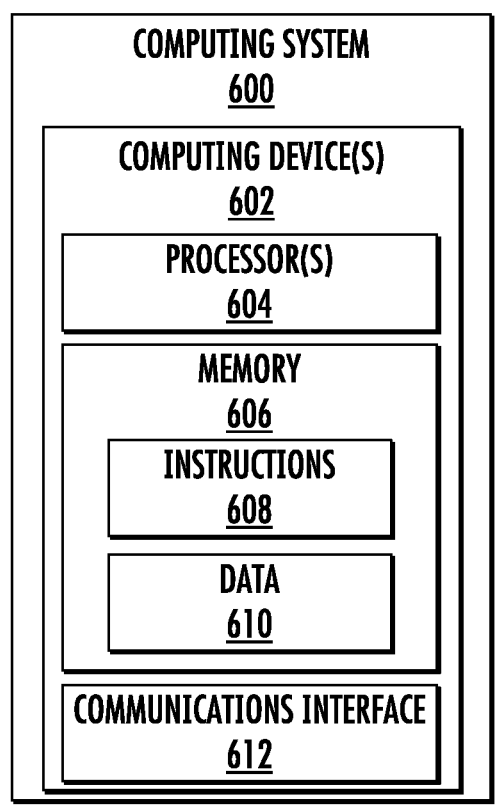
FIG. 13 illustrates a block diagram of a computing system, which may be incorporated in the additive manufacturing system of FIG. 9, in accordance with exemplary aspects of the present disclosure.

FIG. 13 provides a block diagram of an example computing system 600. The computing system 600 can be used to implement the aspects disclosed herein. The computing system 600 can include one or more computing device(s) 602. The control system 206 described above with reference to FIG. 9 may be constructed and may operate in a same or similar manner as one of the computing devices 602, for example.

As shown in FIG. 13, the one or more computing device(s) 602 can each include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data such as engine parameters, model data, logic data, etc., as described herein. The data 610 can include one or more table(s), function(s), algorithm(s), model(s), equation(s), etc., according to example embodiments of the present disclosure.

The one or more computing device(s) 602 can also include a communications interface 612 used to communicate, for example, with the other components of the additive manufacturing system. The communications interface 612 can include any suitable components for interfacing with one or more network(s), including, for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of repairing an airfoil of a turbine component, the airfoil comprising a tip rail that at least partially defines a plurality of tip cooling passages, the turbine component having undergone at least one operational cycle such that a tip portion of the tip rail is outside of a design specification range, the method comprising: removing the tip portion of the tip rail such that a workpiece interface is defined at a radially outer end of the airfoil, wherein after removing the tip portion at least one tip cooling passage of the plurality of tip cooling passages extends to an opening on the workpiece interface; additively manufacturing an extension segment onto the workpiece interface; and machining the extension segment to form a replacement tip portion of the tip rail that is within the design specification range.

The method as in any preceding clause, wherein, prior to the removing step, the plurality of tip cooling passages each comprises a through hole and a counterbore extending from the through hole and radially beyond the through hole, and wherein removing the portion further comprises: removing the tip portion of the tip rail such that the counterbore hole extends radially to the opening on the workpiece interface.

The method as in any preceding clause, wherein prior to the removal step, the counterbore defines a pre-machined radial height, and wherein removing the portion further comprises: removing the tip portion of the tip rail such that a remaining radial height of the counterbore is between about 40% and about 60% of the pre-machined radial height.

The method as in any preceding clause, wherein, prior to the removing step, the plurality of tip cooling passages each comprises a through hole and a counterbore extending from the through hole and radially beyond the through hole, and wherein the method further comprises: removing the tip portion of the tip rail such that a top segment of the counterbore hole is removed and a bottom segment of the counterbore hole extends radially to the opening on the workpiece interface; additively manufacturing the extension segment onto the workpiece interface and across the opening; and removing a portion of the extension segment that corresponds with the top segment of the counterbore hole to restore the counterbore hole.

The method as in any preceding clause, wherein the plurality of tip cooling passages each comprises a through hole and a counterbore extending from the through hole and radially beyond the through hole, and wherein the method further comprises: re-opening the counterbore hole after the additively manufacturing step by removing a portion of the extension segment.

The method as in any preceding clause, wherein no weld material is disposed in plurality of tip cooling passages prior to the removal step and prior to the additively manufacturing step.

The method as in any preceding clause, wherein the method further comprises: welding defects in the tip rail to generate a welded defect; and blending the welded defect flush with the tip rail.

The method as in any preceding clause, wherein additively manufacturing is performed with an additive manufacturing system, the additive manufacturing system includes a vision system operably connected to an additive welding machine and to a control system, wherein the method further comprises: positioning digital markers on a digital representation of the workpiece interface between two neighboring openings after the removing step, the digital representation captured by the vision system.

The method as in any preceding clause, wherein the positioning step is after the removing step and before the additively manufacturing step.

A method of repairing an airfoil of a turbine component, the airfoil comprising a tip rail that at least partially defines a plurality of tip cooling passages, the turbine component having undergone at least one operational cycle such that a tip portion of the tip rail is outside of a design specification range, the method comprising: removing the tip portion of the tip rail such that a workpiece interface is defined at a radially outer end of the airfoil, wherein after removing the tip portion at least one tip cooling passage of the plurality of tip cooling passages extends to an opening on the workpiece interface; additively manufacturing an extension segment onto the workpiece interface and across the opening; machining the extension segment to form a replacement tip portion of the tip rail that is within the design specification range; and re-opening the at least one tip cooling passage of the plurality of tip cooling passages.

The method as in any preceding clause, wherein, prior to the removing step, the plurality of tip cooling passages each comprises a through hole and a counterbore extending from the through hole and radially beyond the through hole, and wherein removing the portion further comprises: removing the tip portion of the tip rail such that the counterbore hole extends radially to the opening on the workpiece interface.

The method as in any preceding clause, wherein prior to the removal step, the counterbore defines a pre-machined radial height, and wherein removing the portion further comprises: removing the tip portion of the tip rail such that a remaining radial height of the counterbore is between about 40% and about 60% of the pre-machined radial height.

The method as in any preceding clause, wherein, prior to the removing step, the plurality of tip cooling passages each comprises a through hole and a counterbore extending from the through hole and radially beyond the through hole, and wherein the method further comprises: removing the tip portion of the tip rail such that a top segment of the counterbore hole is removed and a bottom segment of the counterbore hole extends radially to the opening on the workpiece interface; additively manufacturing the extension segment onto the workpiece interface and across the opening; and removing a portion of the extension segment that corresponds with the top segment of the counterbore hole to restore the counterbore hole.

The method as in any preceding clause, wherein the plurality of tip cooling passages each comprises a through hole and a counterbore extending from the through hole and radially beyond the through hole, and wherein the method further comprises: re-opening the counterbore hole after the additively manufacturing step by removing a portion of the extension segment.

The method as in any preceding clause, wherein no weld material is disposed in plurality of tip cooling passages prior to the removal step and prior to the additively manufacturing step.

The method as in any preceding clause, wherein the method further comprises: welding defects in the tip rail to generate a welded defect; and blending the welded defect flush with the tip rail.

The method as in any preceding clause, wherein additive manufacturing is performed with an additive manufacturing system, the additive manufacturing system includes a vision system operably connected to an additive welding machine and to a control system, wherein the method further comprises: positioning digital markers on a digital representation of the workpiece interface between two neighboring openings after the removing step, the digital representation captured by the vision system.

The method as in any preceding clause, wherein the positioning step is after the removing step and before the additively manufacturing step.

What is claimed is:

1. A method of repairing an airfoil of a turbine component, the airfoil comprising a tip rail that at least partially defines a plurality of tip cooling passages, the turbine component having undergone at least one operational cycle such that a tip portion of the tip rail is outside of a design specification range, the method comprising:
    removing the tip portion of the tip rail such that a workpiece interface is defined at a radially outer end of the airfoil, wherein after removing the tip portion at least one tip cooling passage of the plurality of tip cooling passages extends to an opening on the workpiece interface;
    additively manufacturing an extension segment onto the workpiece interface and across the opening; and
    machining the extension segment to form a replacement tip portion of the tip rail that is within the design specification range.

2. The method as in claim 1, wherein, prior to the removing step, the plurality of tip cooling passages each comprises a through hole and a counterbore extending from the through hole and radially beyond the through hole, and wherein removing the portion further comprises:
    removing the tip portion of the tip rail such that the counterbore hole extends radially to the opening on the workpiece interface.

3. The method as in claim 2, wherein prior to the removal step, the counterbore defines a pre-machined radial height, and wherein removing the portion further comprises:
    removing the tip portion of the tip rail such that a remaining radial height of the counterbore is between about 40% and about 60% of the pre-machined radial height.

4. The method as in claim 1, wherein additively manufacturing is performed with an additive manufacturing system, the additive manufacturing system includes a vision system operably connected to an additive welding machine and to a control system, wherein the method further comprises:
    positioning digital markers on a digital representation of the workpiece interface between two neighboring openings after the removing step, the digital representation captured by the vision system.

5. The method as in claim 4, wherein the positioning step is after the removing step and before the additively manufacturing step.

6. The method as in claim 1, wherein, prior to the removing step, the plurality of tip cooling passages each comprises a through hole and a counterbore extending from the through hole and radially beyond the through hole, and wherein the method further comprises:
    removing the tip portion of the tip rail such that a top segment of the counterbore hole is removed and a bottom segment of the counterbore hole extends radially to the opening on the workpiece interface;
    additively manufacturing the extension segment onto the workpiece interface and across the opening; and
    removing a portion of the extension segment that corresponds with the top segment of the counterbore hole to restore the counterbore hole.

7. The method as in claim 1, wherein the plurality of tip cooling passages each comprises a through hole and a counterbore extending from the through hole and radially beyond the through hole, and wherein the method further comprises:
    re-opening the counterbore hole after the additively manufacturing step by removing a portion of the extension segment.

8. The method as in claim 1, wherein no weld material is disposed in plurality of tip cooling passages prior to the removal step and prior to the additively manufacturing step.

9. The method as in claim 1, wherein the method further comprises:
    welding defects in the tip rail to generate a welded defect; and
    blending the welded defect flush with the tip rail.

10. A method of repairing an airfoil of a turbine component, the airfoil comprising a tip rail that at least partially defines a plurality of tip cooling passages, the turbine component having undergone at least one operational cycle such that a tip portion of the tip rail is outside of a design specification range, the method comprising:
    removing the tip portion of the tip rail such that a workpiece interface is defined at a radially outer end of the airfoil, wherein after removing the tip portion at least one tip cooling passage of the plurality of tip cooling passages extends to an opening on the workpiece interface;
    additively manufacturing an extension segment onto the workpiece interface and across the opening;
    machining the extension segment to form a replacement tip portion of the tip rail that is within the design specification range; and
    re-opening the at least one tip cooling passage of the plurality of tip cooling passages.

11. The method as in claim 10, wherein, prior to the removing step, the plurality of tip cooling passages each comprises a through hole and a counterbore extending from the through hole and radially beyond the through hole, and wherein removing the portion further comprises:
    removing the tip portion of the tip rail such that the counterbore hole extends radially to the opening on the workpiece interface.

12. The method as in claim 11, wherein prior to the removal step, the counterbore defines a pre-machined radial height, and wherein removing the portion further comprises:
    removing the tip portion of the tip rail such that a remaining radial height of the counterbore is between about 40% and about 60% of the pre-machined radial height.

13. The method as in claim 10, wherein additive manufacturing is performed with an additive manufacturing system, the additive manufacturing system includes a vision system operably connected to an additive welding machine and to a control system, wherein the method further comprises:
positioning digital markers on a digital representation of the workpiece interface between two neighboring openings after the removing step, the digital representation captured by the vision system.

14. The method as in claim 13, wherein the positioning step is after the removing step and before the additively manufacturing step.

15. The method as in claim 10, wherein, prior to the removing step, the plurality of tip cooling passages each comprises a through hole and a counterbore extending from the through hole and radially beyond the through hole, and wherein the method further comprises:
removing the tip portion of the tip rail such that a top segment of the counterbore hole is removed and a bottom segment of the counterbore hole extends radially to the opening on the workpiece interface;
additively manufacturing the extension segment onto the workpiece interface and across the opening; and
removing a portion of the extension segment that corresponds with the top segment of the counterbore hole to restore the counterbore hole.

16. The method as in claim 10, wherein the plurality of tip cooling passages each comprises a through hole and a counterbore extending from the through hole and radially beyond the through hole, and wherein the method further comprises:
re-opening the counterbore hole after the additively manufacturing step by removing a portion of the extension segment.

17. The method as in claim 10, wherein no weld material is disposed in plurality of tip cooling passages prior to the removal step and prior to the additively manufacturing step.

18. The method as in claim 10, wherein the method further comprises:
welding defects in the tip rail to generate a welded defect; and
blending the welded defect flush with the tip rail.

* * * * *